US009797442B2

(12) United States Patent
Kim

(10) Patent No.: US 9,797,442 B2
(45) Date of Patent: Oct. 24, 2017

(54) FUEL CONSUMPTION REDUCTION APPARATUS USING VARIABLE PRE-LOAD OF VEHICLE BEARING

(71) Applicant: ECHO TECH CO., LTD., Gwangju (KR)

(72) Inventor: Sung Bok Kim, Gwangju (KR)

(73) Assignee: ECHO TECH CO., LTD., Gwangju (KR)

( * ) Notice: Subject to any disclaimer, the term of this patent is extended or adjusted under 35 U.S.C. 154(b) by 0 days.

(21) Appl. No.: 14/901,749

(22) PCT Filed: Sep. 10, 2014

(86) PCT No.: PCT/KR2014/008448
§ 371 (c)(1),
(2) Date: Dec. 29, 2015

(87) PCT Pub. No.: WO2015/034336
PCT Pub. Date: Mar. 12, 2015

(65) Prior Publication Data
US 2016/0369843 A1 Dec. 22, 2016

(30) Foreign Application Priority Data

Sep. 9, 2013 (KR) .......................... 10-2013-0108128
Oct. 8, 2013 (KR) .......................... 10-2013-0120160

(51) Int. Cl.
*F16C 25/08* (2006.01)
*B60B 27/00* (2006.01)
(Continued)

(52) U.S. Cl.
CPC ............ *F16C 25/08* (2013.01); *B60B 27/001* (2013.01); *B60B 27/0047* (2013.01);
(Continued)

(58) Field of Classification Search
CPC ...... F16C 25/08; F16C 25/083; F16C 19/547; F16C 19/548; B60B 27/001; B60B 27/0047
See application file for complete search history.

(56) References Cited

U.S. PATENT DOCUMENTS 3,313,581 A * 4/1967 Kusakabe .............. B23Q 1/265
384/517
4,023,868 A * 5/1977 Miki ..................... F16C 19/364
384/100
(Continued)

FOREIGN PATENT DOCUMENTS

JP 04-146004 5/1992
JP 06-058329 3/1994
(Continued)

*Primary Examiner* — Thomas R. Hannon
(74) *Attorney, Agent, or Firm* — Lex IP Meister, LLC

(57) ABSTRACT

A fuel-saving apparatus using a variable preload of vehicle bearings is provided. The fuel-saving apparatus includes a housing that supports a driving shaft of a vehicle, a bearing that is mounted in the housing and rotatably supports the driving shaft, and a variable preload unit that is provided at the housing or a side adjacent to the housing and applies a preload to an outer wheel or an inner wheel of the bearing. The fuel-saving apparatus using such a variable preload may reduce a driving load acting on the driving shaft by a fixed preload acting by the bearing, thereby reducing the driving load of an engine and saving fuel.

5 Claims, 11 Drawing Sheets

(51) Int. Cl.
  *F16C 19/54* (2006.01)
  *B60B 11/02* (2006.01)
  *F16C 19/36* (2006.01)

(52) U.S. Cl.
  CPC .......... *F16C 19/547* (2013.01); *F16C 19/548* (2013.01); *B60B 11/02* (2013.01); *F16C 19/364* (2013.01); *F16C 25/083* (2013.01); *F16C 2326/02* (2013.01)

(56) References Cited

U.S. PATENT DOCUMENTS

| | | | | |
|---|---|---|---|---|
| 4,033,645 A | * | 7/1977 | Yamada | F16C 25/08 384/563 |
| 4,657,412 A | * | 4/1987 | McLarty | B23Q 1/265 384/1 |
| 4,676,667 A | * | 6/1987 | Komatsu | F01D 25/16 384/517 |
| 4,850,719 A | * | 7/1989 | Moseley | F16C 25/08 384/1 |
| 5,051,005 A | * | 9/1991 | Duncan | F16C 25/08 384/517 |
| RE34,310 E | * | 7/1993 | Duncan | F16C 25/08 384/517 |
| 5,388,917 A | * | 2/1995 | Hibi | B23Q 1/265 384/493 |
| 5,564,840 A | * | 10/1996 | Jurras, III | F16C 25/083 29/898.09 |
| 5,803,619 A | * | 9/1998 | Tabata | B23Q 1/265 384/518 |
| 6,042,273 A | * | 3/2000 | Thrasher | F16C 25/08 384/517 |
| 7,517,154 B2 | * | 4/2009 | McKeirnan, Jr. | F01D 25/16 384/517 |
| 7,771,124 B2 | * | 8/2010 | Okada | F16C 19/186 384/448 |
| 7,997,804 B2 | * | 8/2011 | Koda | F16C 19/525 384/556 |

FOREIGN PATENT DOCUMENTS

| | | |
|---|---|---|
| JP | 06-341431 | 12/1994 |
| JP | 2003-184873 | 7/2003 |

* cited by examiner

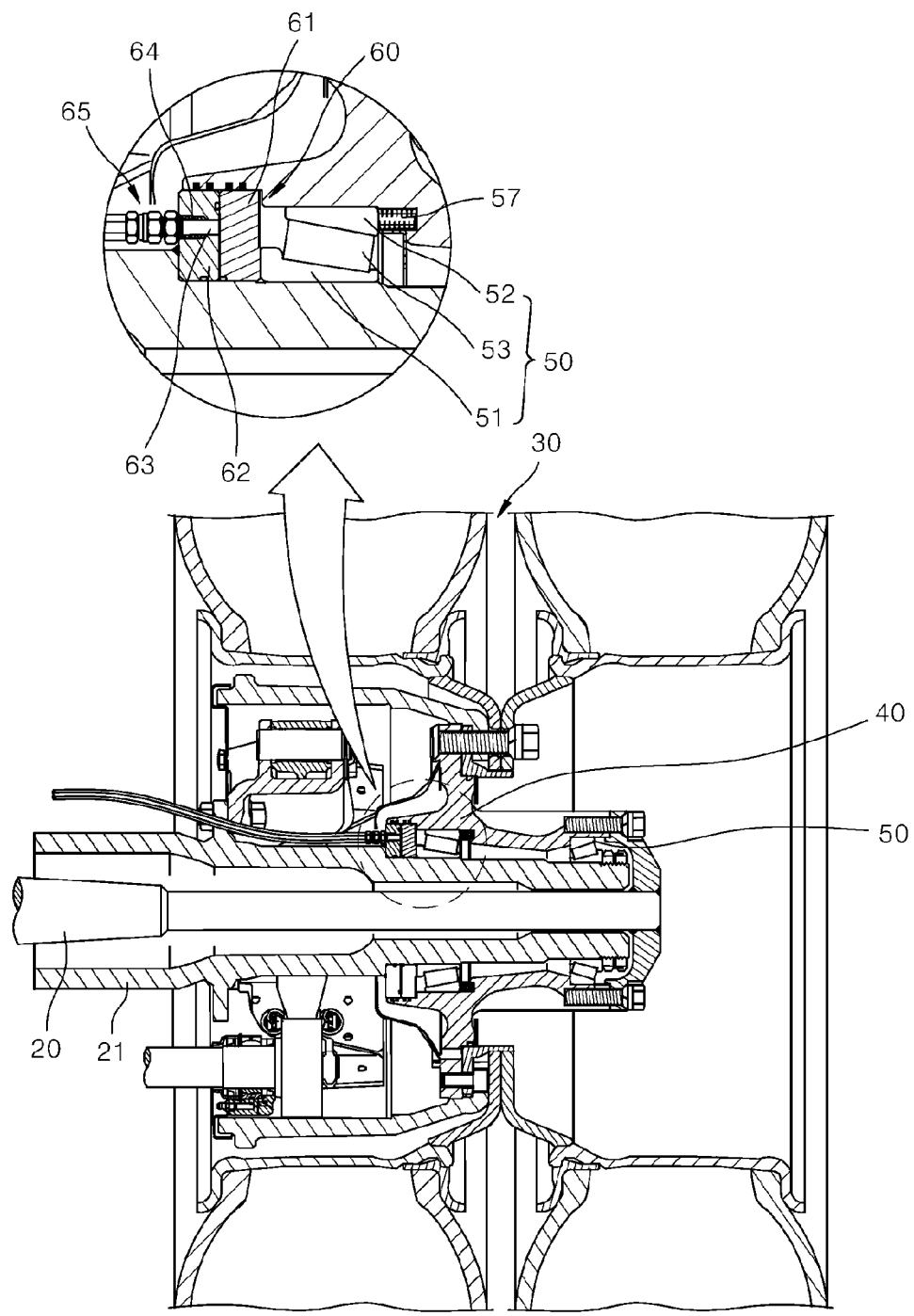
[Fig. 1]

[Fig. 2]
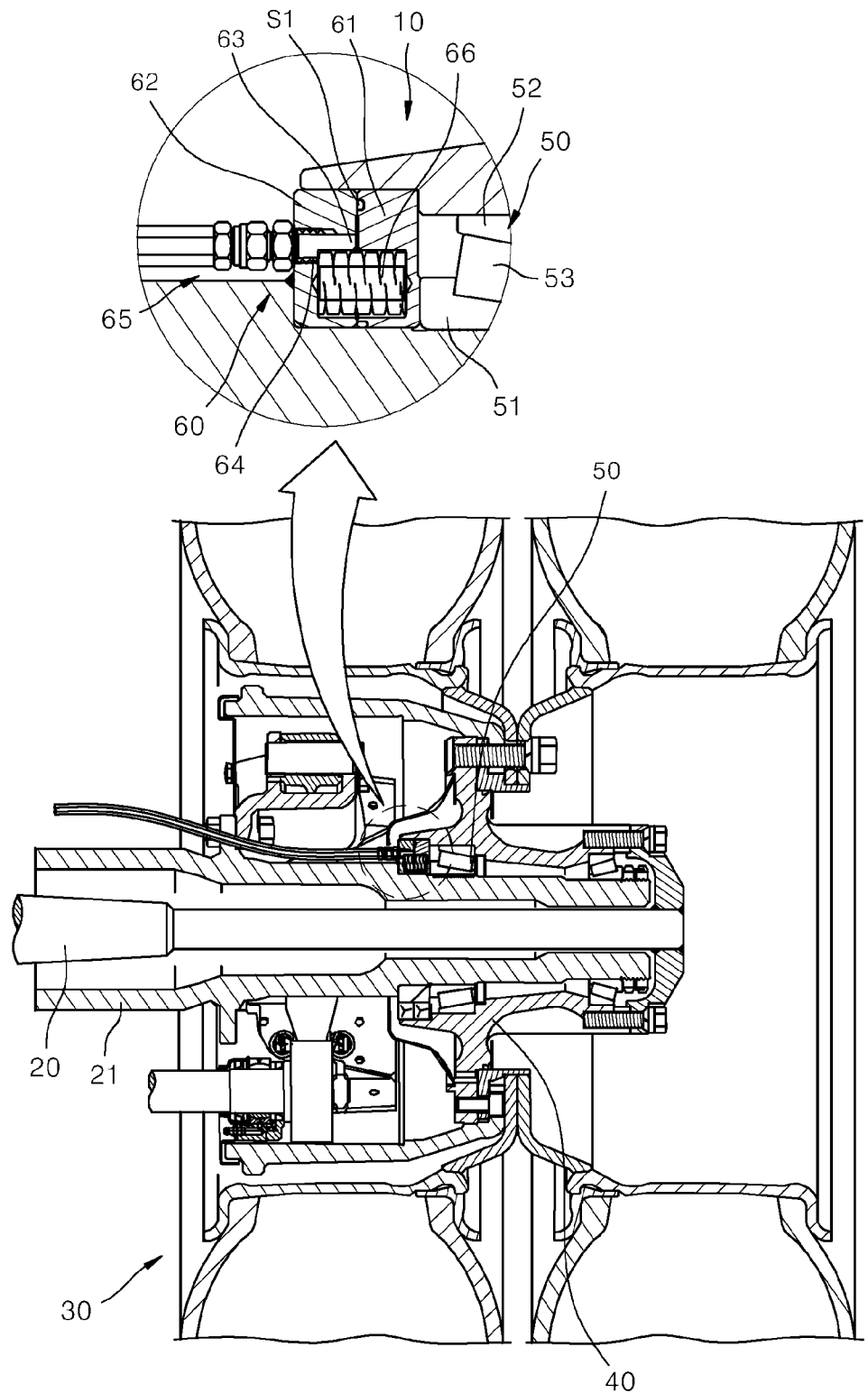

[Fig. 3]
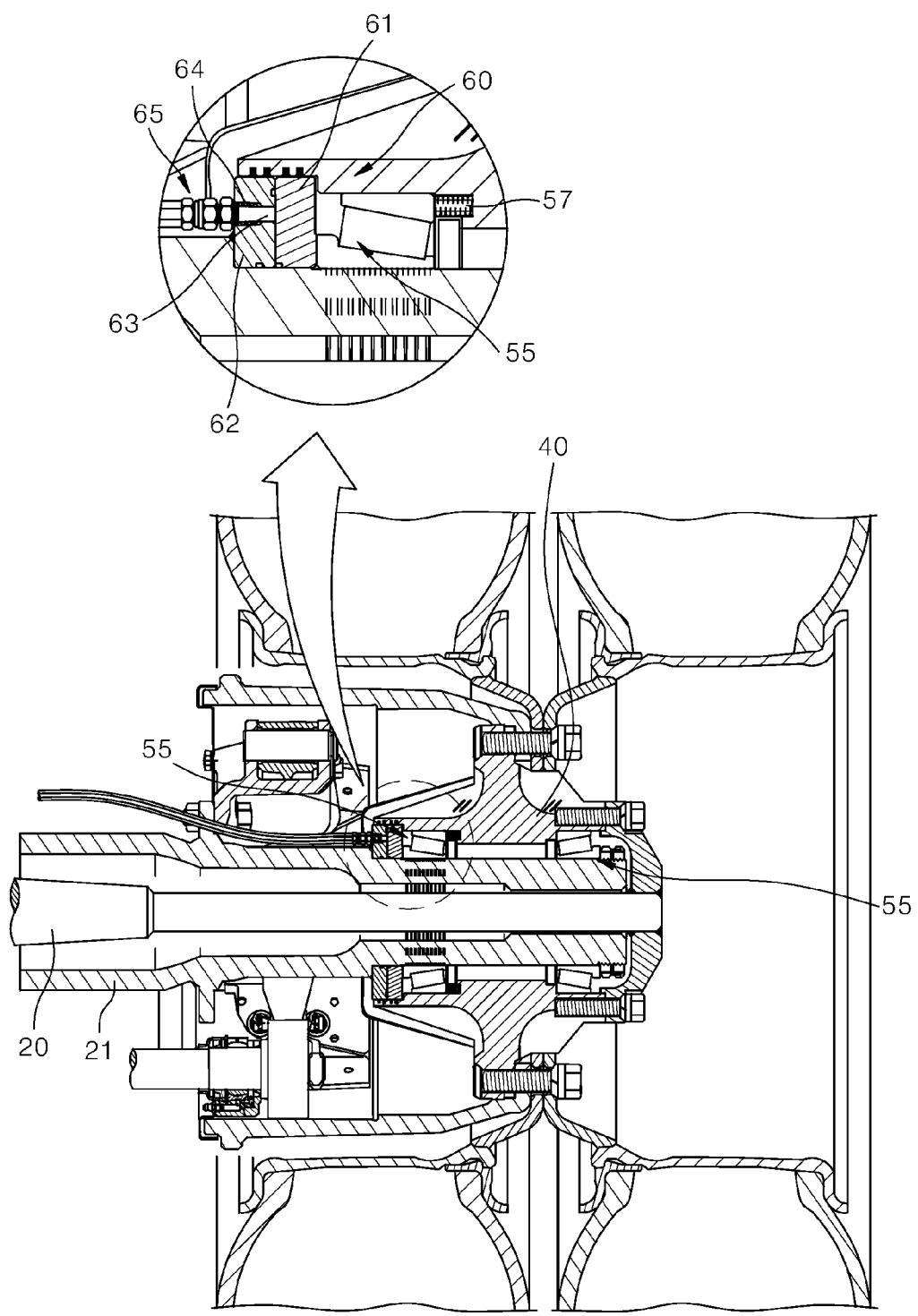

[Fig. 4]
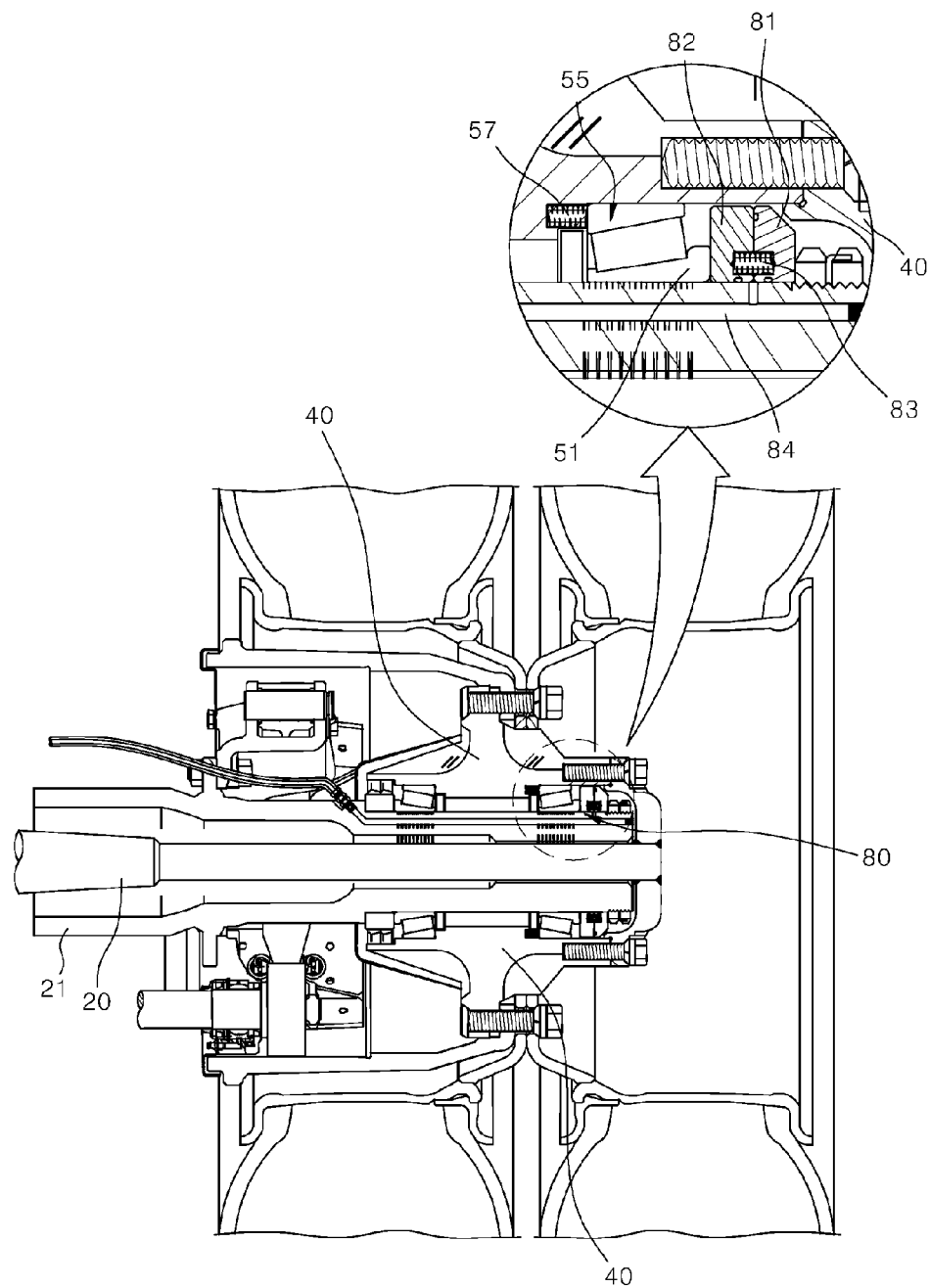

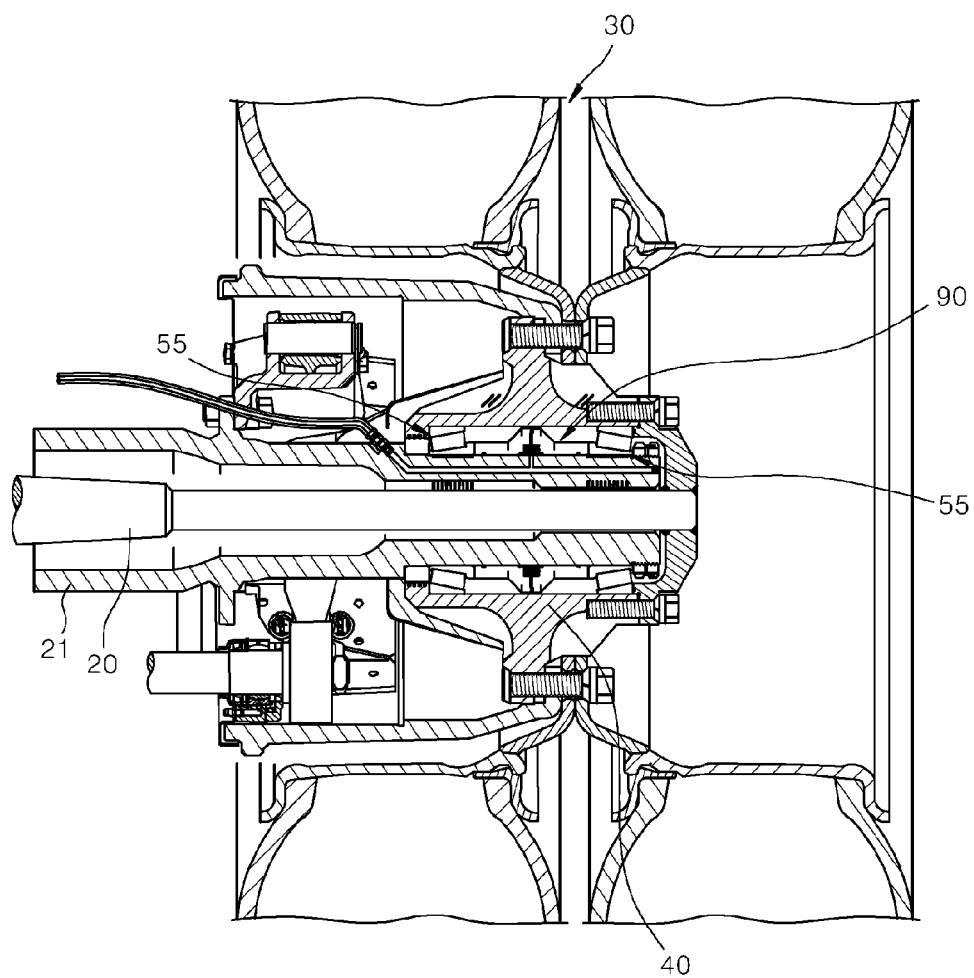
[Fig. 5]

[Fig. 6]
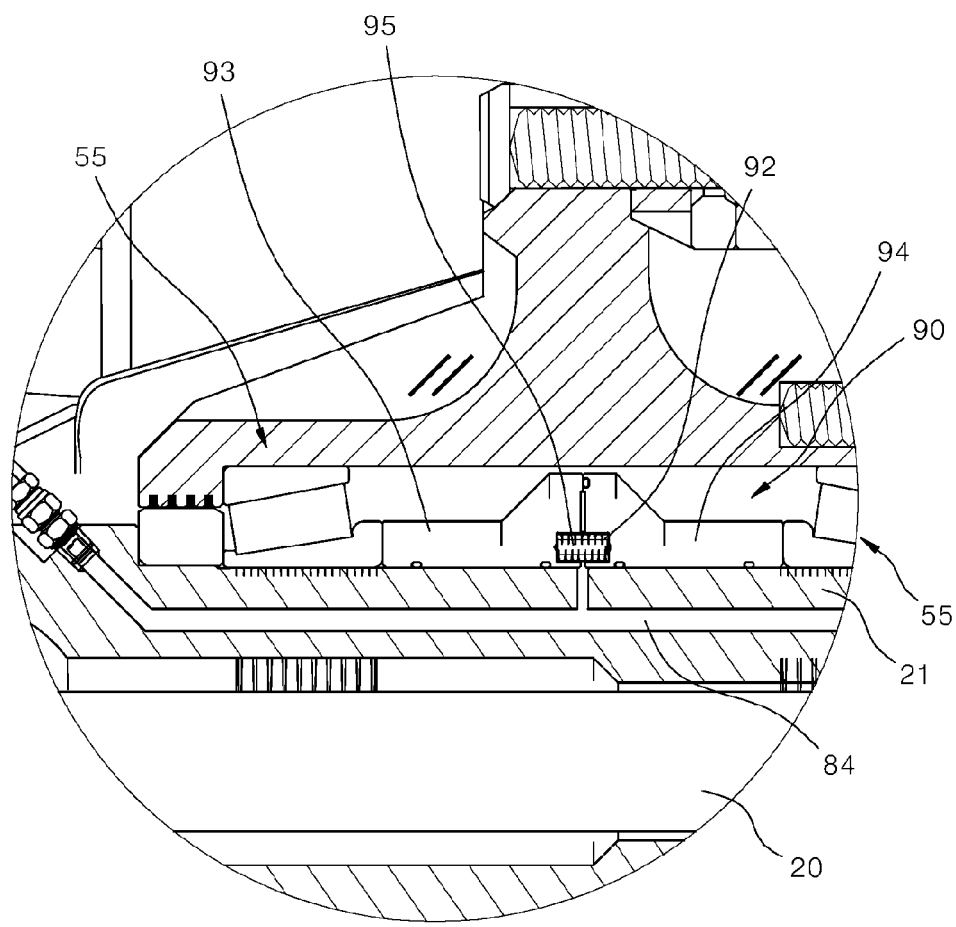

[Fig. 7]
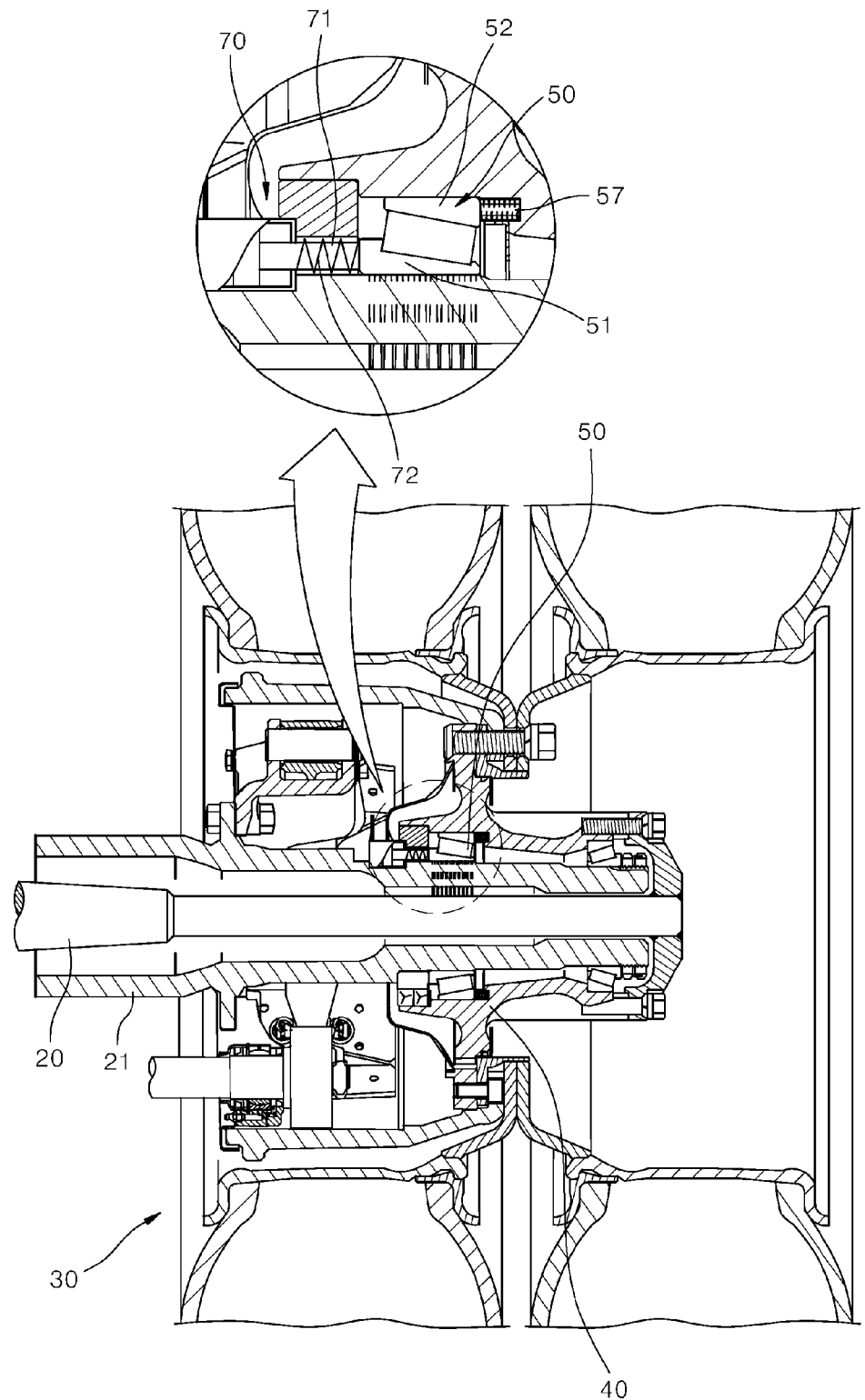

[Fig. 8]
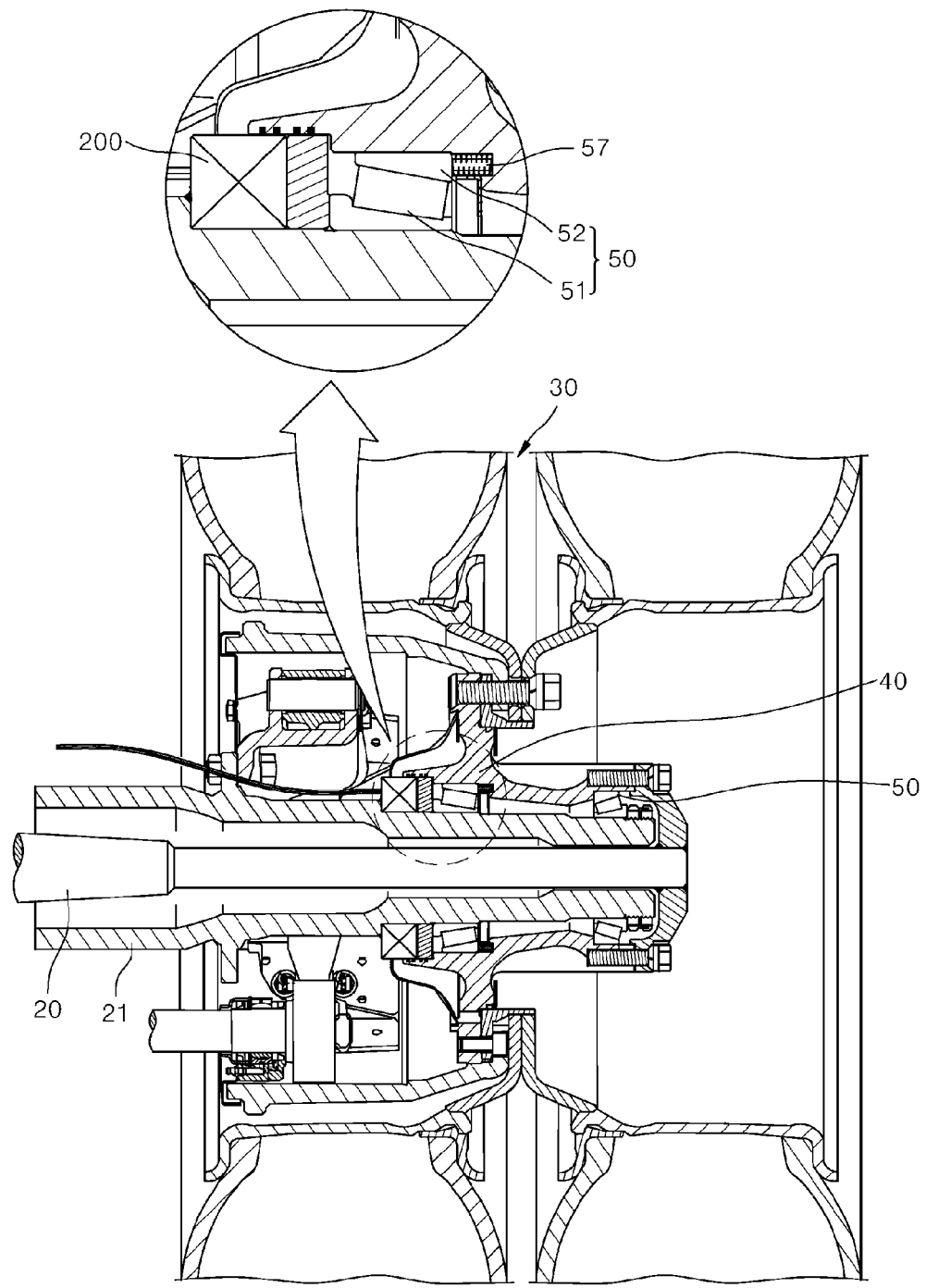

[Fig. 9]
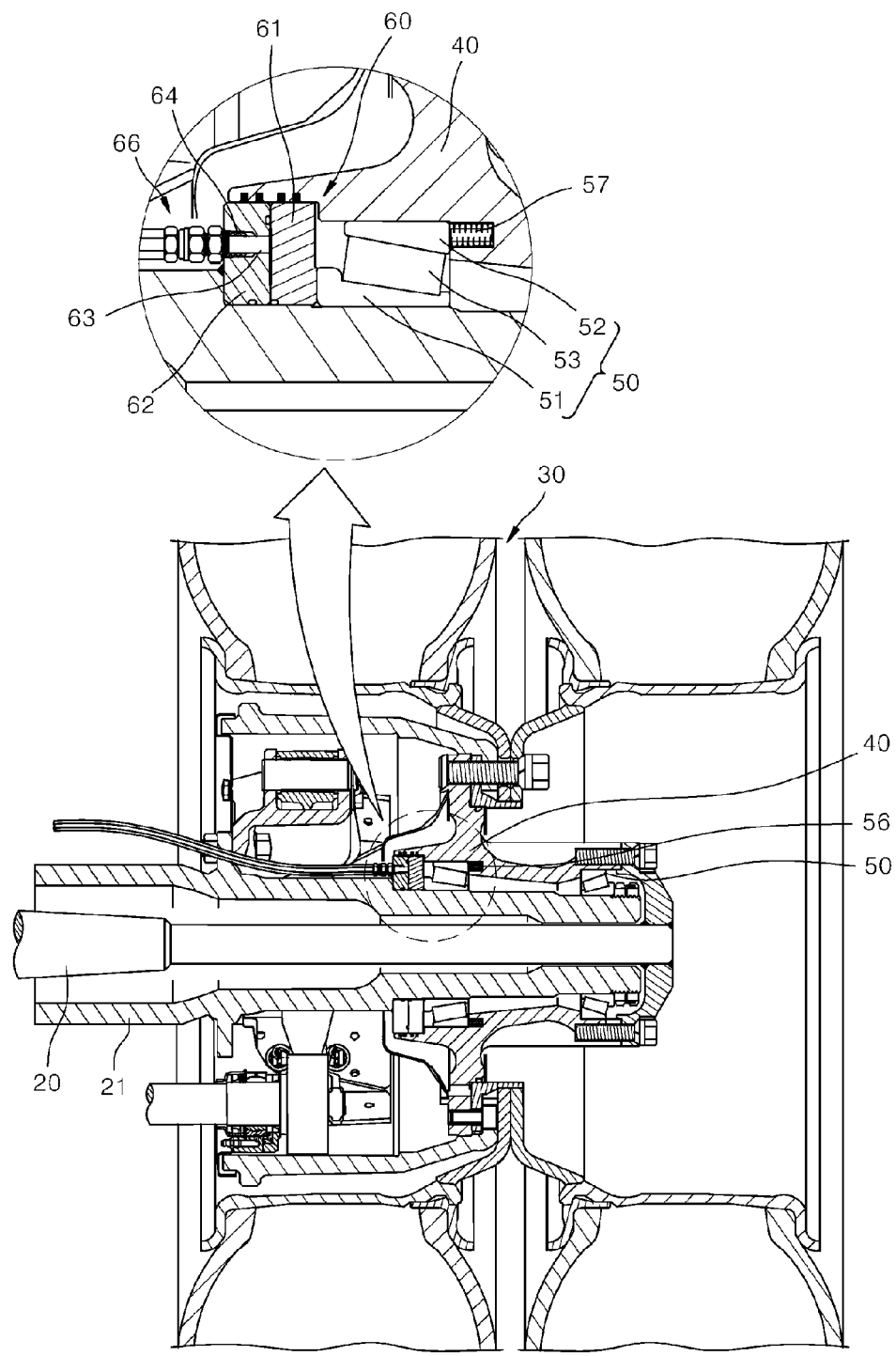

[Fig. 10]
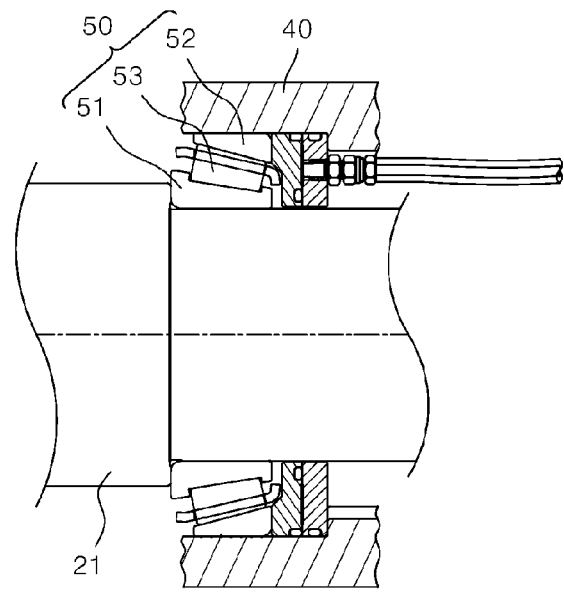
[Fig. 11]
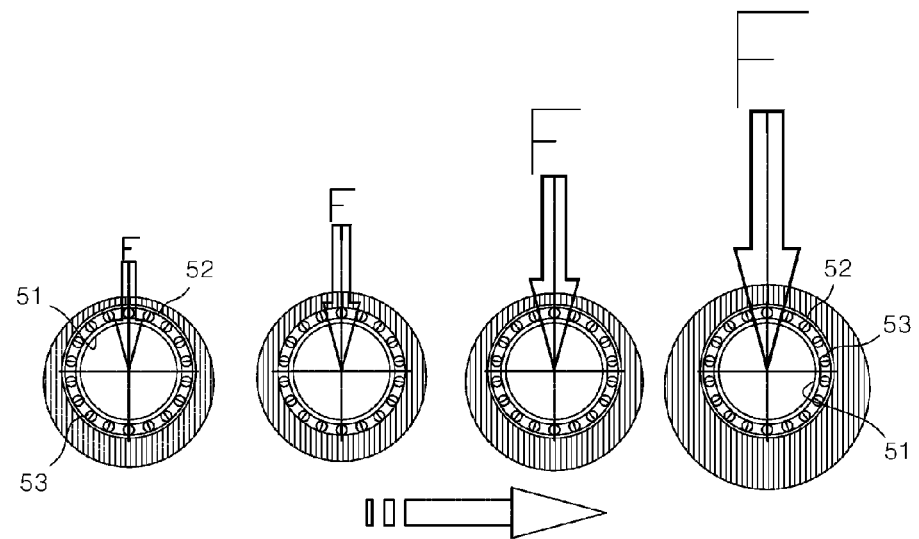

[Fig. 12]
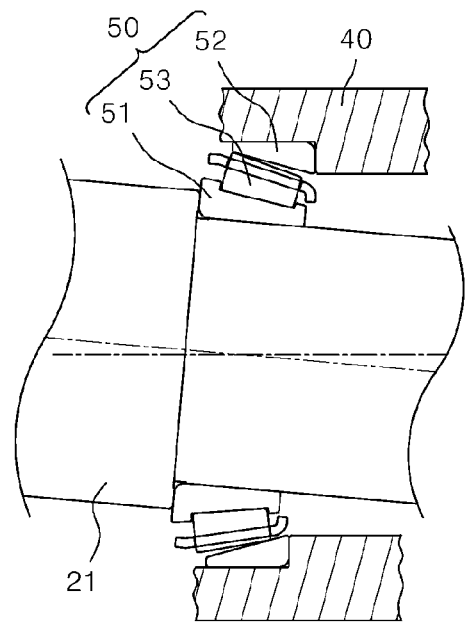
[Fig. 13]
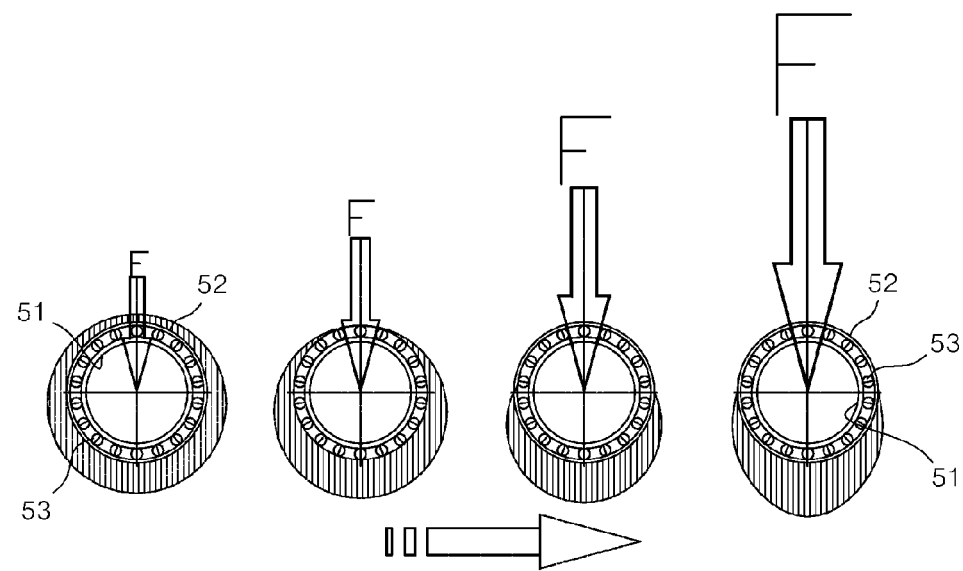

FUEL CONSUMPTION REDUCTION APPARATUS USING VARIABLE PRE-LOAD OF VEHICLE BEARING

TECHNICAL FIELD

The present invention relates to a fuel-saving apparatus using a variable preload, and more particularly, to a fuel-saving apparatus using a variable preload of vehicle bearings, which may realize fuel-saving by applying a variable preload to outer wheels or inner wheels of vehicle bearings such as in a bus, a truck, a passenger car, or the like.

BACKGROUND ART

Typically, the life of a bearing is affected greatly by a preload applied to the bearing, and when a proper preload that is changed depending on a rotating speed and a use condition is applied, it is possible to attenuate the load and variation of a driving shaft.

A bearing assembly is basically configured in such a manner that a proper preload is applied to ensure the rigidity of the driving shaft which is suitable for the use conditions, but, for the reason described above, it is appropriate for the preload to be applied suitably for the use conditions according to the load of the driving shaft and the high-speed or low-speed rotation.

In particular, a constant preload is usually applied to a bearing supporting the driving shaft of a vehicle, and thus a load applied to the driving shaft when the vehicle is empty or full (when cargo is loaded or passengers have boarded the vehicle) is relatively large and a large amount of fuel is consumed. Specifically, a fixed preload is applied to a bearing of a driving shaft system of a conventional vehicle, so that it is possible to suppress the vibration of the driving shaft while accurately positioning the driving shaft in the axial direction and radial direction, and to enhance the rigidity of the bearing. Such a fixed preload applied to the bearing may act on the driving shaft of the vehicle at a constant load, and thereby may cause a problem of increasing the fuel consumption when the vehicle is empty or full.

In this regard, conventionally, the fixed preload of the bearing mounted on an axle is relatively reduced, but in this case, the support force of a tire wheel assembly supported by the axle is reduced, which partially wears down a tire and makes it difficult to achieve stability in toe-in or camber for the steering of the vehicle. When the fixed preload applied to the inner wheel or outer wheel of the bearing is reduced, the tire assembly supported by the axle through the bearing cannot be supported by the axle in an orthogonal direction and vibration is caused by the axle, which makes traveling characteristics unstable.

DISCLOSURE

Technical Problem

The present invention is directed to providing a fuel-saving apparatus using a variable preload of vehicle bearings, which may improve the stability of a bearing by applying the variable preload to an outer wheel or an inner wheel of the bearing mounted in a driving shaft or an axle of a vehicle, thereby saving fuel.

The present invention is also directed to providing a fuel-saving apparatus using a variable preload of vehicle bearings, which may adjust a driving load of a vehicle by changing a preload depending on a load condition and applying the changed preload to an inner wheel or an outer wheel of a bearing supporting a driving shaft when cargo is loaded in the vehicle and when the vehicle is empty or when passengers enter and exit the vehicle, and increase the degree of freedom in designing the bearing.

The present invention is also directed to providing a fuel-saving apparatus using a variable preload of vehicle bearings, which may easily change a preload applied to an inner wheel or an outer wheel of a bearing supporting a driving shaft, thereby easily controlling the fuel-saving apparatus.

Technical Solution

One aspect of the present invention provides a fuel-saving apparatus using a variable preload of vehicle bearings, comprising: a housing that supports a driving shaft of a vehicle; a bearing that is mounted in the housing and rotatably supports the driving shaft; and a variable preload unit that is provided at the housing or a side adjacent to the housing and applies a preload to an outer wheel or an inner wheel of the bearing.

According to the present invention, the driving shaft may be an axle on which wheels of the vehicle are provided, and the variable preload unit may include a pressure member that is brought into contact with the outer wheel or inner wheel of the bearing, a support member that is provided in a bearing housing unit and forms a chamber in which airtightness between the pressure member and the chamber is maintained, and a pressure supply unit that is provided in the outer wheel or inner wheel of the bearing to change the preload by supplying air pressure or oil pressure to the chamber through a supply pipeline provided in the support member.

The variable preload unit may include a cylinder that is provided in the housing and operated by air pressure or oil pressure for applying the variable preload in such a manner that a rod is brought into contact with the outer wheel or inner wheel of the bearing.

Advantageous Effects

A fuel-saving apparatus using a variable preload of vehicle bearings according to the present invention may change a preload depending on a load applied to a bearing mounted in a driving shaft or an axle of a vehicle or a vehicle speed and apply the changed preload, thereby reducing a driving load, saving fuel, and increasing the life of the bearing.

Also, a fuel-saving apparatus using a variable preload of vehicle bearings according to the present invention may improve the support force of a tire wheel assembly supported by an axle by applying a variable preload by air pressure or oil pressure to an outer wheel or an inner wheel of a bearing, thereby preventing the partial wear of a tire and improving steering and traveling characteristics.

DESCRIPTION OF DRAWINGS

FIG. 1 is a cross-sectional view showing a fuel-saving apparatus using a variable preload of vehicle bearings according to an embodiment of the present invention.

FIGS. 2 to 9 are cross-sectional views showing other embodiments of a fuel-saving apparatus using a variable preload of a vehicle bearing according to an embodiment of the present invention.

FIG. 10 is a cross-sectional view showing a state in which a preload is applied to a bearing by a variable preload unit according to an embodiment of the present invention.

FIG. 11 is a view showing a load acting on a rolling ball when a preload is applied to a bearing.

FIG. 12 is a cross-sectional view of a bearing showing a state in which a variable preload is not applied to a bearing mounted on an axle.

FIG. 13 is a view showing a load acting on a rolling ball when a variable preload is not applied to a bearing.

MODES OF THE INVENTION

A fuel-saving apparatus using a variable preload of vehicle bearings according to an embodiment of the present invention shown in FIGS. 1 to 3 may save fuel by adjusting a preload depending on a speed of a vehicle and a load applied to an axle of the vehicle.

Referring to the drawings, the fuel-saving apparatus using the variable preload of vehicle bearings according to an embodiment of the present invention includes an axle 21 that rotatably supports a driving shaft 20 which is rotated by receiving power from an engine of a vehicle, a housing 40 that is rotatably provided on the axle 21 and rotated by the driving shaft 20 and in which a tire wheel assembly 30 is provided, a bearing 50 that is mounted between the axle 21 and the housing 40 and rotatably supports the housing 40 in which the tire wheel assembly 30 is provided, and a variable preload unit 60 that is provided on the axle 21 and the housing 40 or at a side adjacent to the axle 21 and the housing 40 and applies a variable preload to an outer wheel 52 or an inner wheel 51 of the bearing 50.

The variable preload unit 60 includes a first pressure member 61 that is brought into contact with the outer wheel 52 or the inner wheel 51 of the bearing 50 and a first support member 62 that forms a first pressure chamber 63 so that airtightness between the first pressure member 61 and the first pressure chamber 63 is maintained. The first pressure member 61 and the first support member 62 are provided between the axle 21 and the housing 40, so that the first support member 62 is supported by a stepped portion formed on the axle 21. The first support member 62 may be supported by the axle 21 and the housing 40. The first pressure member 61 is slidably provided on the axle 21 and the housing 40 as shown in FIG. 1, and is brought into contact with the inner wheel 51 of the bearing 50 mounted on the axle 21.

The first pressure chamber 63 formed by the first support member 62 and the first pressure member 61 are provided at sides facing each other, and a sealing member S1 is provided in a portion in which the first support member 62 and the first pressure member 61 are tightly adhered to each other, so that pressure applied to the first pressure chamber 62 does not leak. The sealing member Si has elastic force, and an airtight condition should not be damaged by the moving displacement of the first pressure member 61 for applying the variable preload to the first support member 62.

A supply pipeline 64 is formed in the first support member 62, and a pressure supply unit 65 for changing a preload by supplying air pressure or oil pressure to the pressure chamber 63 through the supply pipeline 64 is further provided in the outer wheel or the inner wheel of the bearing. The pressure supply unit includes a well-known hydraulic supply unit or pneumatic supply unit which is provided in a vehicle, and a control valve that controls pressure supplied through the supply pipeline by detecting a rotating speed of the axle or a load applied to the axle, although these are not shown in the drawings. The control valve may be controlled by a control unit that analyzes information detected from a detection sensor for detecting the rotating speed of the axle and a load detection sensor for detecting the load applied to the axle.

Meanwhile, as shown in FIG. 2, the chamber 63 formed in the pressure member 61 and the support member 62 may be formed to be relatively large, and an elastic spring 66 for applying a fixed preload may be formed in the chamber 63.

In the fuel-saving apparatus using the variable preload of vehicle bearings according to the present invention, when a small load is applied to the axle of the vehicle, the preload of the bearing may be relatively reduced and applied, and when a large load is applied to the axle of the vehicle, the preload applied to the bearing may be increased. When oil pressure or air pressure is supplied to the first pressure chamber 63 through the supply pipeline 64 by the pressure supply unit, the first pressure member 61 is slidably moved along the axle 21 and the housing 40 to press the inner wheel 51 of the bearing 50, and thereby the variable preload may be applied to the inner wheel 51 of the bearing 50. When the preload is applied to the inner wheel 51 of the bearing 50, the inner wheel and the outer wheel are stably brought into contact with a rolling ball positioned between the inner wheel and the outer wheel. This may result in an increase in the life of the bearing.

Meanwhile, when two or more bearings 50 supporting the axle are mounted, it is preferable that the variable preload be applied to an inner wheel or outer wheel of a relatively large bearing.

As shown in FIG. 3, when the sizes of the bearings 55 and 55 are the same, it is preferable that the variable preload unit be provided to apply the variable preload to the bearing which is readily mounted, or the variable preload unit may be provided to apply the preload to two bearings.

In FIG. 4, a state in which the variable preload unit capable of applying the variable preload to the inner wheel of the bearing 55 mounted at an end portion of the axle 21 is provided is shown.

The variable preload unit 80 includes a second support member 81 that is provided between the housing 40 and the axle 21, and a second pressure member 82 that is provided between the second support member 81 and the inner wheel 56 of the bearing 55 and forms a second pressure chamber 83 which is tightly adhered to the second support member 81 to apply the preload. The second pressure chamber 83 is connected to a first pressure supply pipeline 84 formed on the axle 21, and the first pressure supply pipeline 84 is connected to the above-described pressure supply unit.

Such a variable preload unit is operated as shown in the above-described embodiment in such a manner that oil pressure or air pressure is supplied to the second pressure chamber 83 through the first pressure supply pipeline 84.

In FIGS. 5 and 6, another embodiment of the variable preload unit according to the present invention is shown. In this embodiment, the same reference numerals refer to like elements.

Referring to the drawings, a variable preload unit 90 may apply a variable preload to inner wheels of a pair of bearings 55 and 55 mounted at an end portion of the axle 21 surrounding the driving shaft 20, and fourth and fifth pressure members 93 and 94 are slidably provided in the axial direction between the pair of bearings 55 and 55 and are brought into contact with the inner wheels of the pair of bearings 55 and 55. A third pressure chamber 92 formed in a portion in which the fourth and fifth pressure members 93 and 94 are tightly adhered to each other may be connected to the first pressure supply pipeline 84 formed on the axle 21, and receive the variable preload depending on conditions, in the same manner as in the above-described embodiment. Here, the third pressure chamber 92 formed by the fourth and fifth pressure members 93 and 94 may be formed on surfaces tightly adhered to each other to be recessed inward. An elastic spring 95 may be provided in the third pressure chamber 92. The elastic spring 95 may move the fourth and fifth pressure members 93 and 94 along the axle 21 so that the variable preload may be applied to the inner wheels or the outer wheels of the bearings 55 and 55.

As oil pressure or air pressure is applied to the first pressure supply pipeline 84 of the variable preload unit 90 configured as described above, the fourth and fifth pressure members 93 and 94 are relatively moved to both sides, so that the variable preload may be applied to the inner wheels of the bearings 55 and 55 supported by the axle 21 at both sides.

As shown in FIG. 7, according to still another embodiment, the variable preload unit is provided in the housing 40 and brought into contact with the outer wheel 52 or the inner wheel 51 of the bearing 50 to apply the variable preload, and includes a cylinder 70 that is operated by oil pressure or air pressure. A rod 71 of the cylinder 70 may be brought into contact with the inner wheel 51 or the outer wheel 52 of the bearing 50, and it is preferable that the rod 71 be brought into contact with the inner wheel 51. A spring 72 for allowing pressure to act as a preload at the time of design may be provided on the rod 71 of the cylinder 70. As the spring 72, one selected from a coil spring and a plate spring may be used, but the present invention is not limited thereto.

The variable preload unit may apply the preload to the inner wheel or the outer wheel of the bearing using an electromagnet (200, see FIG. 8) or using an actuator, a worm screw, a link, or the like, but is not limited to the above-described embodiments.

Meanwhile, in the above-described embodiments, a return spring 57 may be provided between the outer wheel 52 of the bearing 50 and the housing 40, so that the outer wheel 52 of the bearing 50 to which the preload is applied may be returned to its original position when the preload is removed after the preload is applied.

In the fuel-saving apparatus using the variable preload of vehicle bearings according to the present invention configured as described above, pressure may be applied to the first pressure chamber 63 (the second or third pressure chamber 92) by the pressure supply unit 65 depending on the speed of the vehicle and the load applied to the axle, so that it is possible to apply the set variable preload to the inner wheel or the outer wheel of the bearing 50 or 55 supporting the axle 21. When such a variable preload is applied to the inner wheel or the outer wheel of the bearing, a contact force between the rolling ball 53 and the inner wheel 51 or the outer wheel 52 is uniform despite the change in the load applied to the axle 21 as shown in FIGS. 10 and 11, so that the bearing 50 may be stably rotated. In addition, a relatively equally distributed load acts on each of the rolling ball 53, the inner wheel 51, and the outer wheel 52, thereby reducing the rotational resistance of the bearing, and further improving the fuel economy.

However, when the preload is not applied to the bearing or when a large load is applied to the axle 21 as shown in FIGS. 12 and 13, the contact between the inner wheel 51 or the outer wheel 52 and the rolling ball 53 is limited to a particular portion, that is, the rolling ball 53 positioned in the upper portion of the inner wheel 51 and the outer wheel 52, causing the bearing to be easily damaged and the load to act intensively on that particular portion, and therefore the rotational resistance may be increased. Consequently, the increased rotational resistance may act as a load of a vehicle engine, thereby increasing the fuel consumption.

In particular, when the contact between the inner wheel or the outer wheel of the bearing and the rolling ball is non-uniform and an intensive load acts on a particular portion, the bearing housing supported by the outer wheel may be vibrated, which may cause the partial wear of the tire, resulting in an increase in the traveling resistance. When the preload is not applied to a bearing of a front wheel shaft as described above, stability of camber, toe-in, or the like may decrease due to the above-described problem, and it is difficult to promote the improvement of the steering characteristics.

The fuel-saving apparatus using the variable preload of vehicle bearings according to the present invention may adjust the preload depending on the load applied to the axle, thereby preventing a constant fixed preload applied by the bearing supporting the axle from acting as a driving load. As a result, it is possible to reduce the driving load applied to the engine of the vehicle, thereby saving fuel in the vehicle. In addition, it is possible to increase the life of the bearing, and in particular, it is possible to appropriately apply the fixed preload acting as the driving load applied to the axle, thereby maximizing the fuel saving effect.

While the invention has been shown and described with reference to certain exemplary embodiments thereof, it will be understood by those skilled in the art that various changes in form and details may be made therein without departing from the spirit and scope of the invention as defined by the appended claims.

INDUSTRIAL APPLICABILITY

The fuel-saving apparatus using the variable preload of vehicle bearings according to the present invention may be widely applicable to driving shafts of a variety of vehicles such as trucks, buses, heavy equipment, construction machinery, passenger car, and the like.

The invention claimed is:

1. A fuel-saving apparatus using a variable preload of vehicle bearings, comprising:
   an axle of a vehicle;
   a bearing that is mounted on the axle and rotatably supports a housing; and
   a variable preload unit that is provided at the axle, the housing, or a side adjacent to the axle and the housing, and applies a variable preload to an outer wheel or an inner wheel of the bearing depending on a load applied to the axle,
   wherein the variable preload unit includes
   a first support member that is provided on the axle,
   a first pressure member that is slidably supported by the axle and the housing, brought into contact with the outer wheel or inner wheel of the bearing, and forms a first pressure chamber with the first support member, and
   a pressure supply unit that moves the first pressure member by supplying air pressure or oil pressure to the first pressure chamber through a first supply pipeline provided in the first support member, and thereby applies the variable preload to the outer wheel or the inner wheel of the bearing, and
   wherein the variable preload unit is provided on the axle, and includes a cylinder that is operated by air pressure or oil pressure and of which a rod is brought into contact with the outer wheel or inner wheel of the bearing.

2. The fuel-saving apparatus of claim 1, wherein an elastic spring for applying a fixed preload to the inner wheel of the bearing is provided in the first pressure chamber.

3. The fuel-saving apparatus of claim 1, wherein a spring for applying a fixed preload to the inner wheel of the bearing is provided on the rod of the cylinder.

4. A fuel-saving apparatus using a variable preload of vehicle bearings, comprising:
an axle of a vehicle;
a bearing that is mounted on the axle and rotatably supports a housing; and
a variable preload unit that is provided at the axle, the housing, or a side adjacent to the axle and the housing, and applies a variable preload to an outer wheel or an inner wheel of the bearing depending on a load applied to the axle,
wherein the variable preload unit applies the variable preload to each of the inner wheels of a pair of bearings mounted on the axle surrounding a driving shaft,
first and second pressure members are slidably provided on the axle between the pair of bearings in the axial direction and brought into contact with the inner wheel of each of the bearings,
a first pressure chamber is formed in a portion in which the first and second pressure members are tightly adhered to each other, and
a first pressure supply pipeline for supplying air pressure or oil pressure to the first pressure chamber is formed on the axle.

5. A fuel-saving apparatus using a variable preload of vehicle bearings, comprising:
an axle of a vehicle;
a bearing that is mounted on the axle and rotatably supports a housing; and
a variable preload unit that is provided at the axle, the housing, or a side adjacent to the axle and the housing, and applies a variable preload to an outer wheel or an inner wheel of the bearing depending on a load applied to the axle,
wherein the variable preload unit includes
a first support member that is provided on the axle,
a first pressure member that is slidably supported by the axle and the housing, brought into contact with the outer wheel or inner wheel of the bearing, and forms a first pressure chamber with the first support member, and
a pressure supply unit that moves the first pressure member by supplying air pressure or oil pressure to the first pressure chamber through a first supply pipeline provided in the first support member, and thereby applies the variable preload to the outer wheel or the inner wheel of the bearing, and
wherein a return spring is provided between the outer wheel of the bearing and the housing.

* * * * *